(12) United States Patent
Wang et al.

(10) Patent No.: US 10,931,892 B2
(45) Date of Patent: Feb. 23, 2021

(54) METHOD AND APPARATUS FOR STORING COMMODITY, AND COMPUTER READABLE STORAGE MEDIUM

(71) Applicant: BOE Technology Group Co., Ltd., Beijing (CN)

(72) Inventors: Xiaohong Wang, Beijing (CN); Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 128 days.

(21) Appl. No.: 16/154,497

(22) Filed: Oct. 8, 2018

(65) Prior Publication Data

US 2019/0306440 A1   Oct. 3, 2019

(30) Foreign Application Priority Data

Mar. 29, 2018   (CN) .......................... 201810271875.3

(51) Int. Cl.
*H04N 5/33* (2006.01)
*G06T 7/73* (2017.01)
*G06T 7/90* (2017.01)
*G01J 5/08* (2006.01)
(Continued)

(52) U.S. Cl.
CPC ................. *H04N 5/33* (2013.01); *G01J 5/08* (2013.01); *G06F 9/541* (2013.01); *G06T 7/73* (2017.01); *G06T 7/90* (2017.01); *G01J 2005/0077* (2013.01); *G06T 2207/10048* (2013.01)

(58) Field of Classification Search
CPC ...... G07G 1/12; G01J 5/00; G01J 2005/0077;
G01J 5/025; G01J 5/027; G01J 5/0003;
G01K 1/02; G01K 13/00; G06F 9/541;
G06T 2207/10048; G06T 7/73; G06T 7/90; G06K 9/00664; H04N 5/33
See application file for complete search history.

(56) References Cited

U.S. PATENT DOCUMENTS 6,938,793 B2 *   9/2005   Lerner ................ A47J 36/2494
                                                        220/574.2
6,996,402 B2 *   2/2006   Logan ..................... G06F 3/002
                                                        455/456.1
(Continued)

FOREIGN PATENT DOCUMENTS

CN        101477346 A       7/2009
CN        101714224 A       5/2010
(Continued)

OTHER PUBLICATIONS

Office Action issued in corresponding Chinese Patent Application No. 201810271875.3, dated Mar. 16, 2020.

*Primary Examiner* — Philip P. Dang
(74) *Attorney, Agent, or Firm* — McDermott Will & Emery LLP

(57) ABSTRACT

The present disclosure relates to a method and apparatus for storing a commodity and a computer readable storage medium. The method for storing a commodity includes: acquiring a temperature of the commodity; comparing the temperature with temperature thresholds to obtain a comparison result; and determining, according to the comparison result, whether to generate a prompt message for prompting to store the commodity in a thermal insulation device.

13 Claims, 9 Drawing Sheets

(51) Int. Cl.
*G06F 9/54* (2006.01)
*G01J 5/00* (2006.01)

(56) References Cited

U.S. PATENT DOCUMENTS

| | | | | |
|---|---|---|---|---|
| 7,075,442 B2* | 7/2006 | Lion | ...................... | G01K 1/024 |
| | | | | 340/540 |
| 7,340,414 B2* | 3/2008 | Roh | ...................... | G06Q 20/203 |
| | | | | 340/595 |
| 7,596,432 B2* | 9/2009 | Boer | ...................... | F25D 29/00 |
| | | | | 700/300 |
| 7,658,334 B2* | 2/2010 | Glielmo | ............... | G06Q 10/087 |
| | | | | 236/51 |
| 8,109,446 B2* | 2/2012 | Venancio | ................ | F25D 29/00 |
| | | | | 236/46 C |
| 9,501,174 B2* | 11/2016 | Doyle | .................. | G06F 3/0418 |
| 9,773,141 B2* | 9/2017 | Kozicki | ........... | G06K 19/06046 |
| 9,889,250 B2* | 2/2018 | Blomquist | .......... | A61M 5/1413 |
| 10,049,236 B1* | 8/2018 | Alkarmi | ................ | G06Q 10/08 |
| 10,130,232 B2* | 11/2018 | Atchley | ............... | G05D 1/0088 |
| 10,189,691 B2* | 1/2019 | High | ..................... | B60L 53/63 |
| 10,203,746 B2* | 2/2019 | Kumar | .................. | G06F 1/3243 |
| 10,217,149 B2* | 2/2019 | Zimmerman | ...... | G06Q 30/0601 |
| 10,309,945 B2* | 6/2019 | Mandava | ............... | G01K 1/024 |
| 10,315,897 B2* | 6/2019 | High | ................. | G06K 9/00671 |
| 10,354,479 B2* | 7/2019 | Huang | ................ | A47J 39/003 |
| 10,365,671 B1* | 7/2019 | Nelson | ................ | G06Q 10/087 |
| 10,588,178 B1* | 3/2020 | Nelson | ................ | H04N 5/2258 |
| 2004/0130442 A1* | 7/2004 | Breed | ................... | G02B 27/01 |
| | | | | 340/443 |
| 2010/0143544 A1* | 6/2010 | Narumiya | ............... | A21C 15/00 |
| | | | | 426/95 |
| 2012/0303480 A1* | 11/2012 | Stone | ....................... | G06Q 30/00 |
| | | | | 705/26.8 |
| 2013/0186888 A1* | 7/2013 | Connors | .................. | H05B 6/80 |
| | | | | 219/756 |
| 2013/0209623 A1* | 8/2013 | Beaumont | ................ | A23B 7/04 |
| | | | | 426/123 |
| 2014/0122296 A1* | 5/2014 | Jung | ..................... | G06F 16/248 |
| | | | | 705/26.61 |
| 2014/0158340 A1* | 6/2014 | Dixler | .................... | F28D 20/02 |
| | | | | 165/287 |
| 2015/0178676 A1* | 6/2015 | Carr | .................. | G06Q 10/0836 |
| | | | | 705/332 |
| 2015/0346800 A1* | 12/2015 | Kumar | .................... | G06F 1/206 |
| | | | | 713/323 |
| 2016/0047786 A1* | 2/2016 | Owens | .................. | A23L 3/0155 |
| | | | | 426/418 |
| 2016/0379434 A1* | 12/2016 | Huang | .................... | G07F 11/00 |
| | | | | 99/334 |
| 2017/0001785 A1* | 1/2017 | Ripley | .................... | F25D 17/02 |
| 2017/0290345 A1* | 10/2017 | Garden | .................. | B25J 9/0093 |
| 2017/0351276 A1* | 12/2017 | Setchell | ............... | F27D 21/0014 |
| 2018/0003572 A1* | 1/2018 | Garsd | ...................... | G01K 3/14 |
| 2018/0082343 A1* | 3/2018 | Gordon | ............. | G01C 21/3407 |
| 2018/0088098 A1* | 3/2018 | Mandava | ............... | G01N 33/02 |
| 2018/0286035 A1* | 10/2018 | Kozicki | .................. | G06T 7/0008 |
| 2019/0234673 A1* | 8/2019 | Pitsinki | .................... | G05D 7/06 |

FOREIGN PATENT DOCUMENTS

| | | |
|---|---|---|
| CN | 105096073 A | 11/2015 |
| CN | 105242711 A | 1/2016 |
| CN | 105627690 A | 6/2016 |
| CN | 107176195 A | 9/2017 |
| CN | 107767102 A | 3/2018 |
| JP | 2007111137 A | 5/2007 |

* cited by examiner

US 10,931,892 B2

METHOD AND APPARATUS FOR STORING COMMODITY, AND COMPUTER READABLE STORAGE MEDIUM

CROSS-REFERENCE TO RELATED APPLICATION(S)

This application claims priority to the Chinese Patent Application No. CN201810271875.3, filed on Mar. 29, 2018, which is incorporated herein by reference in its entirety.

TECHNICAL FIELD

The present disclosure relates to the field of data processing technologies, and more particularly, to a method and apparatus for storing a commodity and a computer readable storage medium.

BACKGROUND

Currently, when a user is shopping, the user may place cold commodities (for example, ice cream, meat which needs to be kept in cold storage, etc.) and hot commodities (for example, hot meals, hot dishes, etc.) together in a shopping cart. However, due to thermal interaction between the cold commodities and the hot commodities, the cold commodities may be melted or warmed up which results in deterioration of the cold commodities, and the hot commodities may be cooled which affects the quality of the hot commodities. In addition, in a checkout process, if the user discovers occurrence of the above conditions of the cold commodities or the hot commodities, the user may discard the commodities, thereby causing losses to a shopping mall.

SUMMARY

According to a first aspect of the embodiments of the present disclosure, there is provided a method for storing a commodity, comprising: acquiring a temperature of the commodity; comparing the temperature with temperature thresholds to obtain a comparison result; and determining, according to the comparison result, whether to generate a prompt message for prompting to store the commodity in a thermal insulation device.

In an embodiment, the thermal insulation device is a first thermal insulation device for preserving coldness or a second thermal insulation device for preserving heat; and the determining, according to the comparison result, whether to generate a message for prompting to store the commodity in a thermal insulation device comprises: if the comparison result indicates that the temperature is less than or equal to a first temperature threshold, determining to generate a prompt message for prompting to store the commodity in the first thermal insulation device; if the comparison result indicates that the temperature is greater than or equal to a second temperature threshold, determining to generate a prompt message for prompting to store the commodity in the second thermal insulation device, wherein the second temperature threshold is greater than the first temperature threshold; and if the comparison result indicates that the temperature is greater than or equal to the first temperature threshold and less than or equal to the second temperature threshold, not generating the prompt message.

In an embodiment, the method further comprises: acquiring an image of the thermal insulation device; and determining, according to an identification code of the thermal insulation device in the image, whether the thermal insulation device is the first thermal insulation device or the second thermal insulation device.

In an embodiment, the method further comprises: acquiring an image of the thermal insulation device; determining whether the commodity is a first stored commodity in the thermal insulation device; and if so, determining, according to the comparison result corresponding to the commodity, whether the thermal insulation device is the first thermal insulation device for preserving coldness or the second thermal insulation device for preserving heat.

In an embodiment, the method further comprises: acquiring an image at a specified location in a shopping cart; analyzing, based on the image, whether a thermal insulation device is disposed in the shopping cart; and if so, displaying an icon of the thermal insulation device; and if not, generating a prompt message for prompting to get a thermal insulation device at a designated location.

In an embodiment, the method further comprises: acquiring an image of the thermal insulation device; analyzing, according to the image, whether the commodity is stored in the thermal insulation device to obtain an analysis result; and generating a prompt message corresponding to the image according to the analysis result.

In an embodiment, generating a prompt message corresponding to the image according to the analysis result comprises: if the analysis result indicates that the commodity is not stored in the thermal insulation device, generating a prompt message for prompting to store the commodity in the thermal insulation device.

In an embodiment, generating a prompt message corresponding to the image according to the analysis result comprises: if the analysis result indicates that the commodity has been stored in the thermal insulation device, determining whether the comparison result corresponding to the commodity matches a thermal insulation type of the thermal insulation device, wherein the thermal insulation type comprises a coldness preservation type and a heat preservation type; and if so, generating a prompt message indicating that the storage is successful; and if not, generating a prompt message indicating that the storage is erroneous.

In an embodiment, the method further comprises: if checkout information is received, generating a prompt message for prompting to take out the commodity from the thermal insulation device.

In an embodiment, the method further comprises: acquiring an identification code of the thermal insulation device; and determining, according to the identification code, whether the thermal insulation device is in a sold state or an unsold state.

According to a second aspect of the embodiments of the present disclosure, there is provided an apparatus for storing a commodity, comprising: an infrared camera configured to collect a temperature of the commodity in a shopping cart and transmit the temperature; a processor connected to the infrared camera, and configured to acquire the temperature of the commodity, compare the temperature with temperature thresholds to obtain a comparison result, and determine, according to the comparison result, whether to generate a prompt message for prompting to store the commodity in a thermal insulation device; and a display connected to the processor and configured to display the prompt message.

In an embodiment, the thermal insulation device is a first thermal insulation device for preserving coldness or a second thermal insulation device for preserving heat, and the processor is further configured to: when the comparison result indicates that the temperature is less than or equal to a first temperature threshold, determine to generate a prompt message for prompting to store the commodity in the first thermal insulation device; when the comparison result indicates that the temperature is greater than or equal to a second temperature threshold, determine to generate a prompt message for prompting to store the commodity in the second thermal insulation device, wherein the second temperature threshold is greater than the first temperature threshold; and when the comparison result indicates that the temperature is greater than or equal to the first temperature threshold and less than or equal to the second temperature threshold, not generate the prompt message.

In an embodiment, the apparatus further comprises: a color camera connected to the processor, and configured to collect an image of the thermal insulation device, and transmit the image of the thermal insulation device to the processor, wherein the processor is further configured to: acquire an image of the thermal insulation device; and determine, according to an identification code of the thermal insulation device in the image, whether the thermal insulation device is the first thermal insulation device or the second thermal insulation device.

In an embodiment, the processor is further configured to: determine whether the commodity is a first stored commodity in the thermal insulation device; and when the commodity is a first stored commodity in the thermal insulation device, determine, according to the comparison result corresponding to the commodity, whether the thermal insulation device is the first thermal insulation device for preserving coldness or the second thermal insulation device for preserving heat.

In an embodiment, the color camera is further configured to collect an image at a specified location in the shopping cart, and the processor is further configured to: acquire the image at the specified location in the shopping cart; analyze, based on the image, whether a thermal insulation device is disposed in the shopping cart; and when a thermal insulation device is disposed in the shopping cart, control the display to display an icon of the thermal insulation device; and when no thermal insulation device is disposed in the shopping cart, generate a prompt message for prompting to get a thermal insulation device at a designated location.

In an embodiment, the processor is further configured to: acquire an image of the thermal insulation device; analyze, according to the image, whether the commodity is stored in the thermal insulation device to obtain an analysis result; and generate a prompt message corresponding to the image according to the analysis result.

In an embodiment, the processor is further configured to: when the analysis result indicates that the commodity is not stored in the thermal insulation device, generate a prompt message for prompting to store the commodity in the thermal insulation device.

In an embodiment, the processor is further configured to: when the analysis result indicates that the commodity has been stored in the thermal insulation device, determine whether the comparison result corresponding to the commodity matches a thermal insulation type of the thermal insulation device, wherein the thermal insulation type comprises a coldness preservation type and a heat preservation type; and when the comparison result corresponding to the commodity matches the thermal insulation type of the thermal insulation device, generate a prompt message indicating that the storage is successful; and when the comparison result corresponding to the commodity does not match the thermal insulation type of the thermal insulation device, generate a prompt message indicating that the storage is erroneous.

In an embodiment, the apparatus further comprises: a communicator connected to the processor and a checkout machine at a counter respectively, and configured to receive checkout information transmitted by the checkout machine, and transmit the checkout information to the processor, wherein the processor is further configured to: when the checkout information is received, generate a prompt message for prompting to take out the commodity from the thermal insulation device.

According to a third aspect of the embodiments of the present disclosure, there is provided a computer readable storage medium having stored thereon a computer program, which when being executed by a processor, causes the processor to: acquire a temperature of the commodity; compare the temperature with temperature thresholds to obtain a comparison result; and determine, according to the comparison result, whether to generate a prompt message for prompting to store the commodity in a thermal insulation device.

It should be understood that the above general description and the following detailed description are intended to be illustrative and not restrictive, and are not construed to limit the present disclosure.

BRIEF DESCRIPTION OF THE DRAWINGS

The accompanying drawings here are incorporated in the specification and constitute a part of the specification. The accompanying drawings illustrate embodiments according to the present disclosure and are used in conjunction with the specification to explain the principles of the present disclosure.

DETAILED DESCRIPTION

Exemplary embodiments will be described in detail herein, and examples of the embodiments are illustrated in the accompanying drawings. When the following description refers to the accompanying drawings, the same or similar elements are represented by the same numbers in different accompanying drawings, unless otherwise indicated. Implementations described in the following exemplary embodiments do not represent all implementations according to the present disclosure. Instead, they are merely examples of apparatuses and methods according to some aspects of the present disclosure as detailed in the appended claims.

Figure 1:
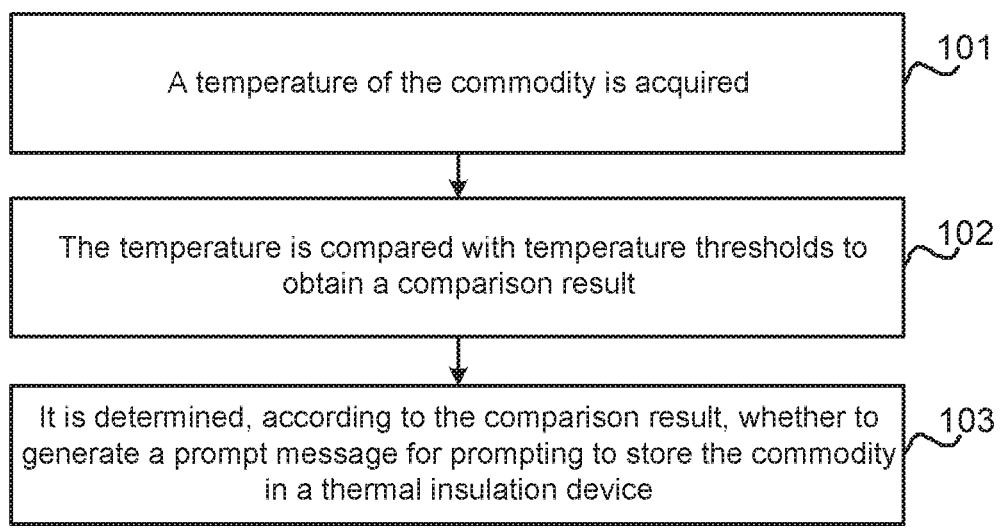
FIG. 1 is a flowchart illustrating a method for storing a commodity according to an embodiment of the present disclosure.

Currently, when a user is shopping, the user may place cold commodities (for example, ice cream, meat which needs to be kept in cold storage, etc.) and hot commodities (for example, hot meals, hot dishes, etc.) together in a shopping cart. However, due to thermal interaction between the cold commodities and the hot commodities, the cold commodities may be melted or warmed up which results in deterioration of the cold commodities, and the hot commodities may be cooled which affects the quality of the hot commodities. In addition, in a checkout process, if the user discovers occurrence of the above conditions of the cold commodities or the hot commodities, the user may discard the commodities, thereby causing losses to a shopping mall. In order to solve the above technical problem, the embodiments of the present disclosure provide a method for storing a commodity. Fig is a flowchart illustrating a method for storing a commodity according to an embodiment of the present disclosure. For convenience of explanation, the following is explained by using a processor as an execution object. As shown in FIG. 1, the method for storing a commodity comprises the following steps.

In step 101, a temperature of the commodity is acquired.

After a user selects a commodity, the user may place the commodity in a shopping cart. In the present embodiment, the processor may acquire a temperature of the commodity in a process of placing or putting the commodity in the shopping cart.

In one embodiment, a plurality of temperature sensors may be disposed on the shopping cart, and when the commodity is placed within a sensing range of one of the temperature sensors, the temperature sensor may acquire a temperature of the commodity and transmit the temperature to the processor.

In another embodiment, an infrared camera may be disposed on the shopping cart. In a process of placing the commodity in the shopping cart, the infrared camera may acquire an infrared image of the commodity, determine a temperature of the commodity according to the infrared image, and transmit the temperature of the commodity to the processor.

Of course, an input device such as a keyboard etc. may be disposed on the shopping cart. When it is detected that a commodity is placed in the shopping cart, the user is prompted to input a temperature of the commodity, which may also implement the solution according to the present application. Those skilled in the art may select an appropriate manner for detecting a temperature according to a specific scenario. In a case where the temperature of the commodity which is placed in the shopping cart is acquired, a corresponding solution falls within the protection scope of the present disclosure.

In step 102, the temperature is compared with temperature thresholds to obtain a comparison result.

In the present embodiment, commodities are classified in cold commodities, ordinary commodities, and hot commodities. Here, the cold commodities are commodities which need to be kept in cold storage (i.e., being placed in a thermal insulation device having a cooling function), such as quick-frozen food, ice cream, etc. The hot commodities are commodities which need to be kept in hot storage (i.e., being placed in a thermal insulation device having a heat preserving function), such as fried dishes, soup dishes, and cooked food etc. The ordinary commodities are commodities which neither need to be kept in cold storage nor need to be kept in heat storage, such as biscuits, snacks, etc.

In order to better reflect a kind of the commodity, a first temperature threshold and a second temperature threshold are preset in the present embodiment of the present disclosure. In one embodiment, the second temperature threshold is greater than the first temperature threshold. In other words, when the temperature of the commodity is less than or equal to the first temperature threshold, the commodity belongs to the cold commodities; when the temperature of the commodity is greater than or equal to the second temperature threshold, the commodity belongs to the hot commodities; and when the temperature of the commodity is greater than the first temperature threshold and less than the second temperature threshold, the commodity belongs to the ordinary commodities.

It can be understood that specific values of the first temperature threshold and the second temperature threshold may be set according to different commodities, and details thereof will not be described here again.

In one embodiment, after the temperature of the commodity is acquired, the processor compares the temperature with the first temperature threshold and/or the second temperature threshold to obtain a comparison result.

For example, when a temperature of a certain commodity is less than or equal to the first temperature threshold, it may be directly determined that the commodity is a cold commodity, and there is no need to compare the temperature of the commodity with the second temperature threshold at this time. As another example, when a temperature of a certain commodity is greater than or equal to the second temperature threshold, it may be directly determined that the commodity is a hot commodity, and there is no need to compare the temperature of the commodity with the first temperature threshold at this time. As a further example, when a temperature of a certain commodity is greater than the first temperature threshold, it also needs to compare the temperature of the commodity with the second temperature threshold. When the temperature of the commodity is greater than or equal to the second temperature threshold, it may be determined that the commodity is a hot commodity, and when the temperature of the commodity is less than the second temperature threshold, it may be determined that the commodity is an ordinary commodity.

In step 103, it is determined, according to the comparison result, whether to generate a prompt message for prompting to store the commodity in a thermal insulation device.

In the present embodiment, the processor determines, according to the comparison result, whether to generate a prompt message for prompting to store the commodity in a thermal insulation device. For example, if the comparison result indicates that the commodity is a cold commodity, the processor generates a prompt message for prompting to store the commodity in a thermal insulation device having a coldness preserving function. As another example, if the comparison result indicates that the commodity is a hot commodity, the processor generates a prompt message for prompting to store the commodity in a thermal insulation device having a heat preserving function. As a further example, if the comparison result indicates that the commodity is an ordinary commodity, the processor does not generate a prompt message.

In the present embodiment, the prompt information for prompting to store the commodity in a thermal insulation device is generated, which may prompt the user to store the commodity in the thermal insulation device in time to avoid the temperature of the commodity from decreasing or increasing, thereby maintaining the quality of the commodity and improving the shopping experience of the user. In addition, after the solution according to the present embodiment is used, the temperature of the commodity is well maintained (the temperature is substantially unchanged or a change in the temperature is within an acceptable range), so that the phenomenon of discarding commodities can be reduced, thereby reducing merchants' losses.

In order to facilitate the user to use the thermal insulation device, in one embodiment of the present disclosure, the thermal insulation device may be disposed at a specified location in the shopping cart. The specified location may be a bottom of the shopping cart or a side of a handshake of the shopping cart, which is not limited. If the thermal insulation device has a three-dimensional structure, it may occupy a large space of the shopping cart. To this end, in one embodiment of the present disclosure, the thermal insulation device may have a folded structure. For example, the thermal insulation device comprises an upper cover and a foldable case. The foldable case is unfolded to be assembled in a preset order in use, and then the upper cover is fixed on the case, so that the thermal insulation device may be formed. As another example, the thermal insulation device may comprise a plurality of thermal insulation splints, and is provided with a movable thermal insulation splint. A location of the movable thermal insulation splints may be adjusted, so that sizes of a thermal insulation space and an ordinary space and may be adjusted. It can be understood that the structure of the thermal insulation device may be set according to a specific scenario, which is not limited in the present disclosure.

Figure 2:
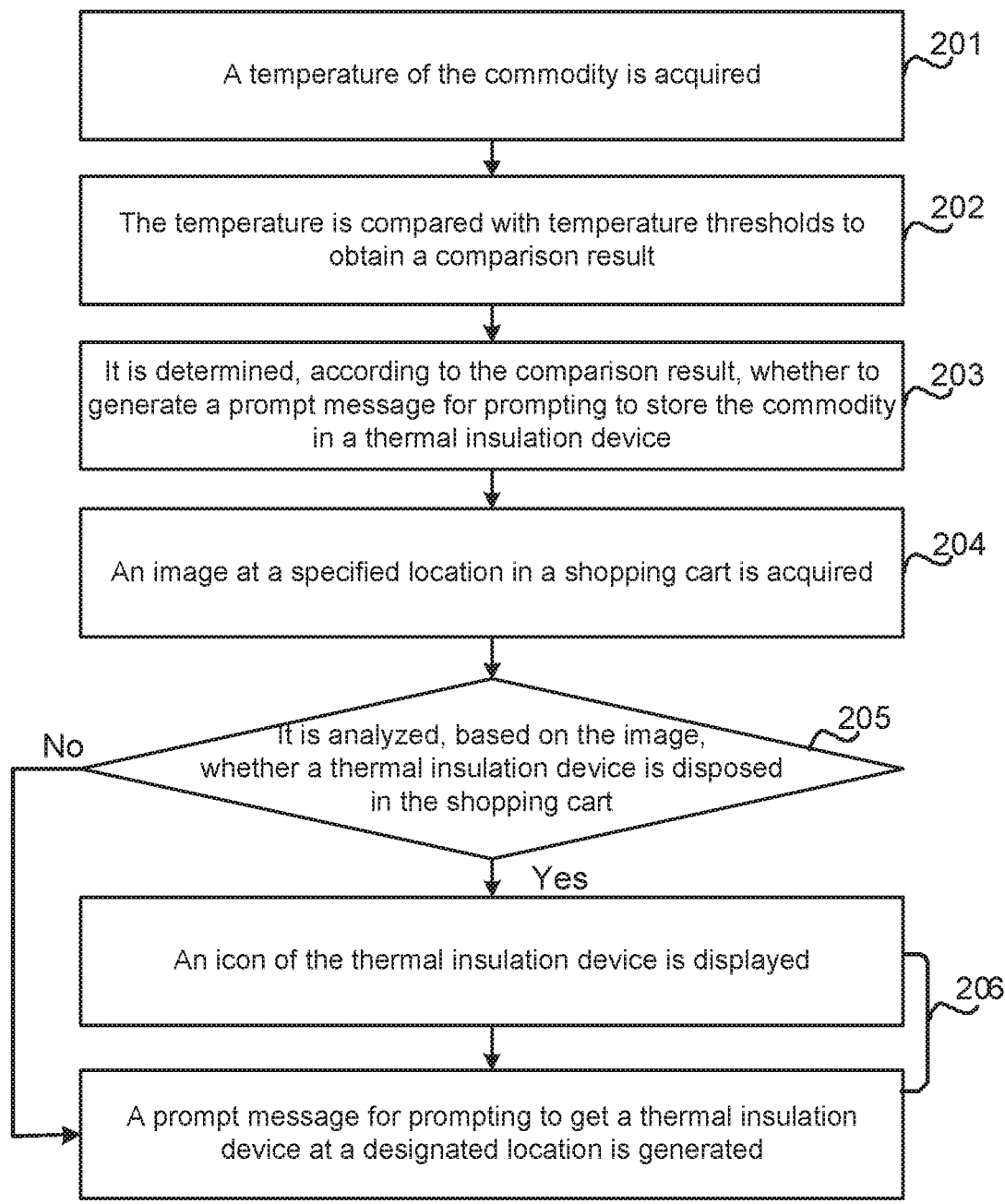
FIG. 2 is a flowchart illustrating another method for storing a commodity according to an embodiment of the present disclosure.

In a case where a thermal insulation device in a form of folded structure is disposed on the shopping cart, the user may not be able to find the thermal insulation device in time. In order to solve the above technical problem, the embodiments of the present disclosure provide a method for storing a commodity. FIG. 2 is flowchart illustrating another method for storing a commodity according to an embodiment of the present disclosure. As shown in FIG. 2, the method for storing a commodity comprises the following steps.

In step 201, a temperature of the commodity is acquired.

A specific method and principle of step 201 are the same as those of step 101, and details thereof can be known with reference to the related content of FIG. 1 and step 101, which will not be described here again.

In step 202, the temperature is compared with temperature thresholds to obtain a comparison result.

A specific method and principle of step 202 are the same as those of step 102, and details thereof can be known with reference to the related content of FIG. 1 and step 102, which will not be described here again.

In step 203, it is determined, according to the comparison result, whether to generate a prompt message for prompting to store the commodity in a thermal insulation device.

A specific method and principle of step 203 are the same as those of step 103, and details thereof can be known with reference to the related content of FIG. 1 and step 103, which will not be described here again.

In step 204, an image at a specified location in a shopping cart is acquired.

In one embodiment of the present disclosure, a color camera is further disposed on the shopping cart. The color camera may be disposed at the specified location in the shopping cart, and a region (i.e., a specified region) in which an image is collected by the color camera may cover the entire shopping cart. The specified location may be a front end of the shopping cart, a tail end of the shopping cart, or a holding part of the shopping cart, which may be set according to a specific scenario.

In the present embodiment, in a case where it is determined that it needs to store the commodity in the thermal insulation device, the processor may trigger the color camera to collect an image at the specified location, and then acquire the image fed back by the color camera.

In step 205, it is analyzed, based on the image, whether a thermal insulation device is disposed in the shopping cart.

In the present embodiment, the processor analyzes the image according to a preset image processing algorithm to determine whether a thermal insulation device is disposed in the shopping cart.

In one embodiment, the processor trains the image processing algorithm using a large number of images to form a corresponding template. If a similarity between the image and the template exceeds a similarity threshold, the processor determines that there is a thermal insulation device at the specified location in the shopping cart, and if the similarity between the image and the template is less than the similarity threshold, the processor determines that there is no thermal insulation device at the specified location in the shopping cart.

In another embodiment, different colors or identifications may be set for thermal insulation devices, and the processor analyzes the image using the image processing algorithm to determine whether one of the colors or identifications exists in the image. If one of the colors or identifications exists, the processor determines that there is a thermal insulation device at the specified location in the shopping cart, and if none of the colors or identifications exists, the processor determines that there is no thermal insulation device at the specified location in the shopping cart.

In step 206, when a thermal insulation device is disposed in the shopping cart, an icon of the thermal insulation device is displayed; and when no thermal insulation device is disposed in the shopping cart, a prompt message for prompting to get a thermal insulation device at a designated location is generated.

In one embodiment, when a thermal insulation device is disposed in the shopping cart, the processor triggers the display to display an icon of the thermal insulation device, and may also display a corresponding text description, which indicates, for example, a location, a color, an arrangement mode, a usage mode, and a thermal insulation type etc. of the thermal insulation device.

In another embodiment, when there is no thermal insulation device in the shopping cart, the processor generates a prompt message for prompting to get a thermal insulation device at a designated location. Further, the processor may also generate a navigation route according to a current location of the shopping cart and the designated location, to facilitate the user to quickly find the thermal insulation device.

It can be seen that in the present embodiment, it is determined whether a thermal insulation device is disposed in the shopping cart, which may enable the user to get and install the thermal insulation device in time. This is convenient for storing the commodity in the thermal insulation device in time to avoid affecting the quality of the commodity due to temperature change.

Figure 3:
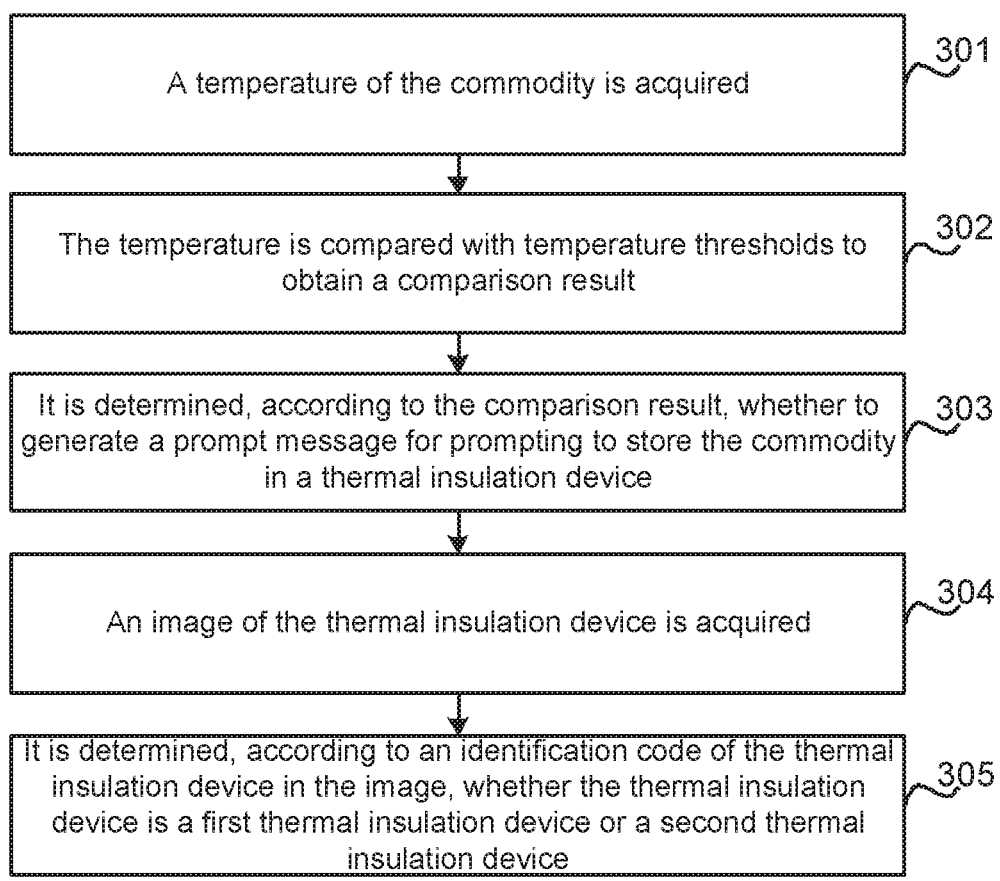
FIG. 3 is a flowchart illustrating still another method for storing a commodity according to an embodiment of the present disclosure.

The embodiments of the present disclosure provide a method for storing a commodity. FIG. 3 is a flowchart illustrating still another method for storing a commodity according to an embodiment of the present disclosure. As shown in FIG. 3, the method for storing a commodity comprises the following steps.

In step 301, a temperature of the commodity is acquired.

A specific method and principle of step 301 are the same as those of step 101, and details thereof can be known with reference to the related content of FIG. 1 and step 101, which will not be described here again.

In step 302, the temperature is compared with temperature thresholds to obtain a comparison result.

A specific method and principle of step 302 are the same as those of step 102, and details thereof can be known with reference to the related content of FIG. 1 and step 102, which will not be described here again.

In step 303, it is determined, according to the comparison result, whether to generate a prompt message for prompting to store the commodity in a thermal insulation device.

A specific method and principle of step 303 are the same as those of step 103, and details thereof can be known with reference to the related content of FIG. 1 and step 103, which will not be described here again.

In step 304, an image of the thermal insulation device is acquired.

In the present embodiment, the processor acquires an image of the thermal insulation device transmitted by a color camera. A specific method and principle of step 304 are the same as those of step 204, except that the image of the thermal insulation device is acquired, and details thereof can be known with reference to the related content of FIG. 2 and step 204, which will not be described here again.

In step 305, it is determined, according to an identification code of the thermal insulation device in the image, whether the thermal insulation device is a first thermal insulation device or a second thermal insulation device.

In the present embodiment, the processor analyzes the image of the thermal insulation device and acquires an identification code of the thermal insulation device. The identification code may be a color, a number, a barcode, a two-dimensional code, etc.

Then, the processor determines, according to the identification code, whether the thermal insulation device is a first thermal insulation device or a second thermal insulation device. For example, the color of the first thermal insulation device is "blue", and the color of the second thermal insulation device is "red". When it is analyzed by the processor that the color is "blue", it may be determined that the current thermal insulation device is the first thermal insulation device. When it is analyzed by the processor that the color is "red", it may be determined that the current thermal insulation device is the second thermal insulation device.

Finally, the processor enables the commodity to be stored in a corresponding thermal insulation device according to the comparison result of the temperature of the commodity.

It can be seen that in the present embodiment, a type of the thermal insulation device may be quickly identified through the identification code, which is convenient for the user to store the commodity.

Figure 4:
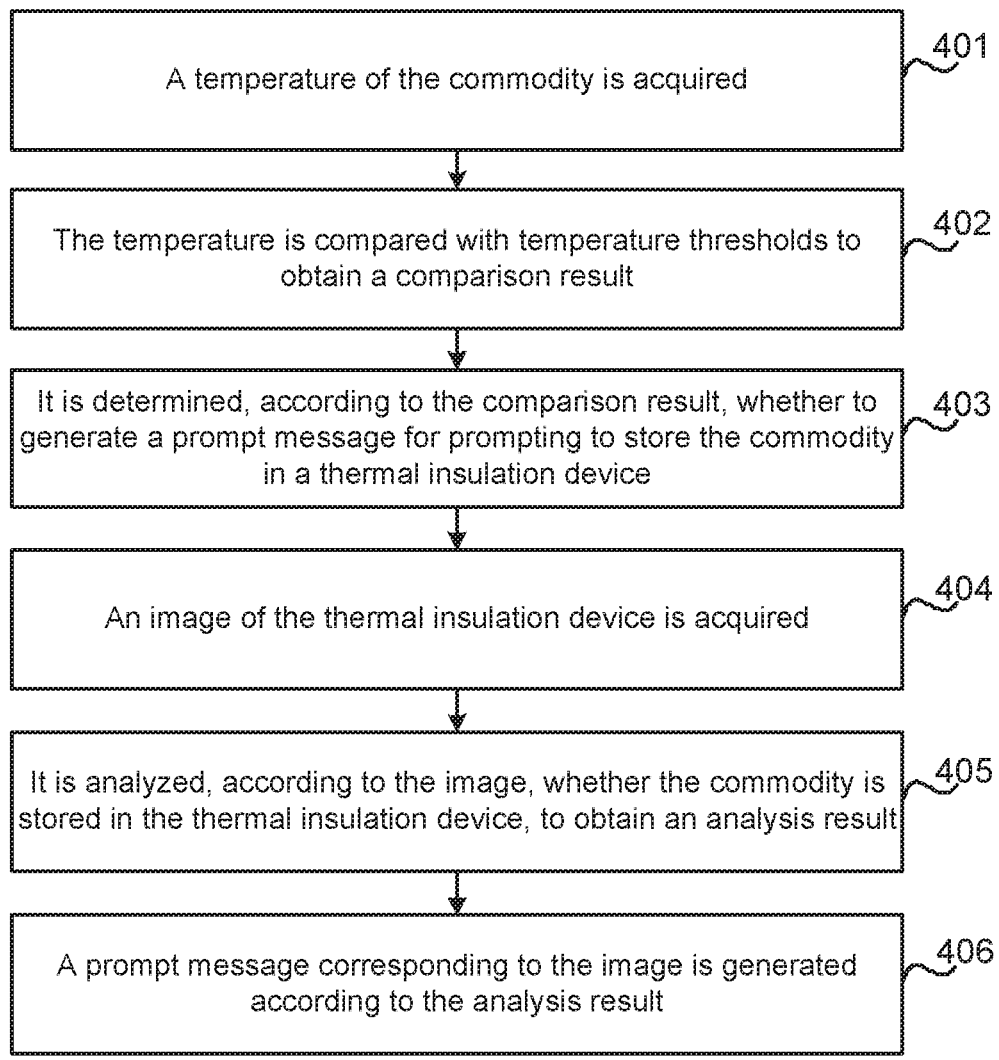
FIG. 4 is a flowchart illustrating still another method for storing a commodity according to an embodiment of the present disclosure.

However, some users pay attention to the choice of commodities, while ignoring the type of the thermal insulation device, and thus erroneously store the commodity in a thermal insulation device, for example, a user may store a cold commodity in a thermal insulation device for preserving heat, or store a hot commodity in a thermal insulation device for preserving coldness, thus accelerating the temperature change of the commodity. To this end, the embodiments of the present disclosure further provide a method for storing a commodity. FIG. 4 is a flowchart illustrating still another method for storing a commodity according to an embodiment of the present disclosure. As shown in FIG. 4, the method for storing a commodity comprises the following steps.

In step 401, a temperature of the commodity is acquired.

A specific method and principle of step 401 are the same as those of step 101, and details thereof can be known with reference to the related content of FIG. 1 and step 101, which will not be described here again.

In step 402, the temperature is compared with temperature thresholds to obtain a comparison result.

A specific method and principle of step 402 are the same as those of step 102, and details thereof can be known with reference to the related content of FIG. 1 and step 102, which will not be described here again.

In step 403, it is determined, according to the comparison result, whether to generate a prompt message for prompting to store the commodity in a thermal insulation device.

A specific method and principle of step 403 are the same as those of step 103, and details thereof can be known with reference to the related content of FIG. 1 and step 103, which will not be described here again.

In step 404, an image of the thermal insulation device is acquired.

A specific method and principle of step 404 are the same as those of step 304, and details thereof can be known with reference to the related content of FIG. 3 and step 304, which will not be described here again.

In step 405, it is analyzed, according to the image, whether the commodity is stored in the thermal insulation device, to obtain an analysis result.

In the present embodiment, the processor analyzes the image using an image processing algorithm to determine whether the commodity is stored in the thermal insulation device, which may obtain an analysis result. For example, if a plurality of images captured by a color camera comprise the commodity and the thermal insulation device, a distance between the commodity and the thermal insulation device is smaller and smaller, and the commodity is in a state where the commodity is stored in the thermal insulation device in subsequent images, the processor may determine that the commodity has been stored in the thermal insulation device. If the thermal insulation device is in an empty state in the images, the processor determines that the commodity is not stored in the thermal insulation device.

In 406, a prompt message corresponding to the image is generated according to the analysis result.

In the present embodiment, when the analysis result indicates that the commodity is not stored in the thermal insulation device, the processor generates a prompt message for prompting to store the commodity in the thermal insulation device. When the analysis result indicates that the commodity has been stored in the thermal insulation device, the processor generates a prompt message indicating that the commodity has been stored in the thermal insulation device.

It can be understood that the above prompt message may be displayed to the user through a display, or may be played to the user through a speaker.

In order to avoid the occurrence of erroneous storage of the commodity in a thermal insulation device, in one embodiment, the processor may further match the comparison result with a thermal insulation type of the thermal insulation device. If the comparison result matches the thermal insulation type, the processor generates a prompt message indicating that the storage is successful; and if the comparison result does not match the thermal insulation type, the processor generates a prompt message indicating that the storage is erroneous.

In the present embodiment, it is analyzed whether the commodity is stored in the thermal insulation device, and prompt information is generated according to an analysis result, which can ensure that the commodity is stored in a matched thermal insulation device to achieve the purpose of maintaining the temperature of the commodity, thereby improving the shopping experience of the user.

Figure 5:
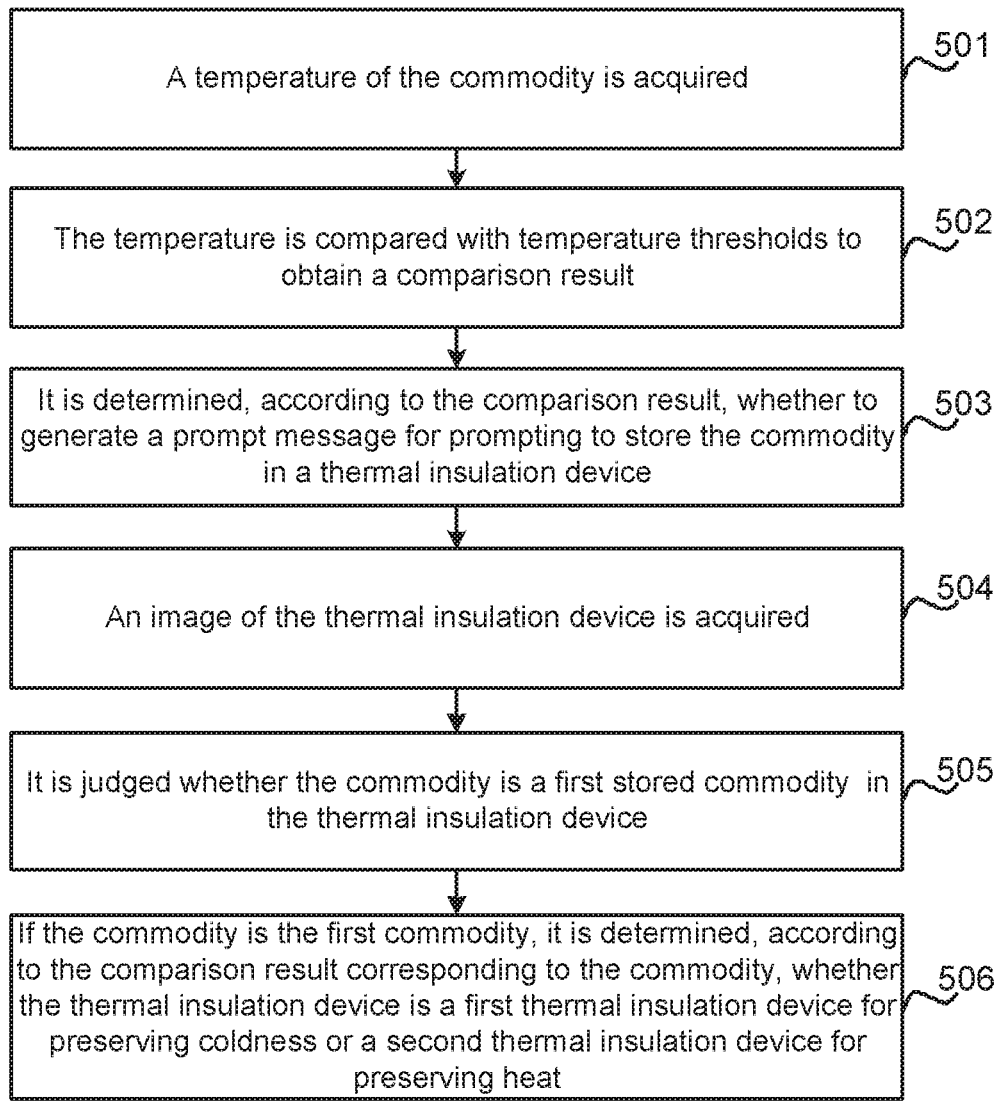
FIG. 5 is a flowchart illustrating still another method for storing a commodity according to an embodiment of the present disclosure.

In practical applications, users prefer to purchase the same type of commodities at the same time, for example, a user purchases cold commodities at the same time, and as another example, a user purchases hot commodities at the same time. At this time, it needs to dispose only one thermal insulation device on the shopping cart to meet the demands. To this end, the embodiments of the present disclosure further provide a method for storing a commodity. FIG. 5 is a flowchart illustrating still another method for storing a commodity according to an embodiment of the present disclosure. As shown in FIG. 5, the method for storing a commodity comprises the following steps.

In step 501, a temperature of the commodity is acquired.

A specific method and principle of step 501 are the same as those of step 101, and details thereof can be known with reference to the related content of FIG. 1 and step 101, which will not be described here again.

In step 502, the temperature is compared with temperature thresholds to obtain a comparison result.

A specific method and principle of step 502 are the same as those of step 102, and details thereof can be known with reference to the related content of FIG. 1 and step 102, which will not be described here again.

In step 503, it is determined, according to the comparison result, whether to generate a prompt message for prompting to store the commodity in a thermal insulation device.

A specific method and principle of step 503 are the same as those of step 103, and details thereof can be known with reference to the related content of FIG. 1 and step 103, which will not be described here again.

In step 504, an image of the thermal insulation device is acquired.

A specific method and principle of step 504 are the same as those of step 304, and details thereof can be known with reference to the related content of FIG. 3 and step 304, which will not be described here again.

In step 505, it is determined whether the commodity is a first stored commodity in the thermal insulation device.

The processor acquires historical storage data of the thermal insulation device, and determines whether the commodity is a first stored commodity in the thermal insulation device.

If the processor analyzes the historical storage data to determine that no commodity is stored in the thermal insulation device, the current commodity is the first stored commodity. If a commodity has already been stored in the thermal insulation device, the current commodity is not the first stored commodity.

In step 506, if the commodity is the first stored commodity, it is determined, according to the comparison result corresponding to the commodity, whether the thermal insulation device is a first thermal insulation device for preserving coldness or a second thermal insulation device for preserving heat.

In the present embodiment, when the commodity is the first stored commodity in the thermal insulation device, the processor determines a type of the thermal insulation device according to the comparison result corresponding to the commodity. For example, when the comparison result indicates that the commodity a cold commodity, the processor determines that the thermal insulation device is a first thermal insulation device for preserving coldness. As another example, when the comparison result indicates that the commodity is a hot commodity, the processor determines that the thermal insulation device is a second thermal insulation device for preserving heat.

In one embodiment, when the commodity stored by the user in the thermal insulation device is not the first stored commodity, the processor determines whether the comparison result corresponding to the commodity matches the thermal insulation device, and if so, the processor generates prompt information for prompting to store the commodity in the current thermal insulation device; and if not, the processor generates prompt information indicating that the comparison result corresponding to the commodity does not match the type of the thermal insulation device, so as to prohibit the commodity from being stored in the current thermal insulation device.

It can be seen that in the present embodiment, the type of the thermal insulation device is determined according to the first stored commodity in the thermal insulation device, which can improve the versatility of the thermal insulation device and improve the use efficiency.

Figure 6:
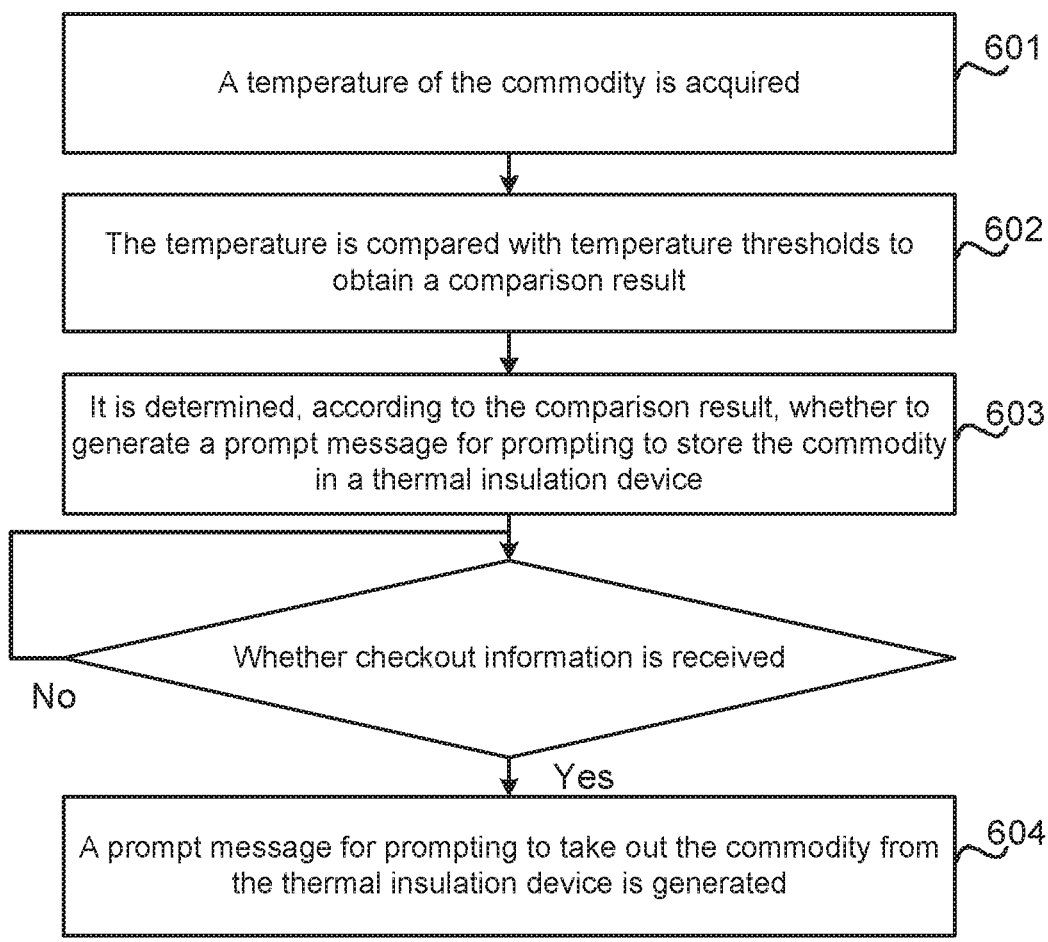
FIG. 6 is a flowchart illustrating still another method for storing a commodity according to an embodiment of the present disclosure.

The embodiments of the present disclosure further provides a method for storing a commodity. FIG. 6 is a flowchart illustrating still another method for storing a commodity according to an embodiment of the present disclosure. As shown in FIG. 6, the method for storing a commodity comprises the following steps.

In step 601, a temperature of the commodity is acquired.

A specific method and principle of step 601 are the same as those of step 101, and details thereof can be known with reference to the related content of FIG. 1 and step 101, which will not be described here again.

In step 602, the temperature is compared with temperature thresholds to obtain a comparison result.

A specific method and principle of step 602 are the same as those of step 102, and details thereof can be known with reference to the related content of FIG. 1 and step 102, which will not be described here again.

In step 603, it is determined, according to the comparison result, whether to generate a prompt message for prompting to store the commodity in a thermal insulation device.

A specific method and principle of step 603 are the same as those of step 103, and details thereof can be known with reference to the related content of FIG. 1 and step 103, which will not be described here again.

In 604, if checkout information is received, a prompt message for prompting to take out the commodity from the thermal insulation device is generated.

In the present embodiment, a shopping cart further comprises a communicator. The communicator is connected to a processor and a checkout machine at a counter, respectively. In this way, the communicator may receive checkout information transmitted by the checkout machine and may transmit the checkout information to the processor.

When the checkout information is not received, the processor remains in a monitoring state until the checkout information is received. When the checkout information is received, the processor generates a prompt message for prompting to take out the commodity from the thermal insulation device.

In the present embodiment, at the end of the checkout, the commodity is taken out from the thermal insulation device to avoid the user from forgetting the commodity and improving the user experience.

In practical applications, the thermal insulation device itself may also be sold as a commodity. At this time, each thermal insulation device may be provided with a unique identification. If a user needs to purchase the thermal insulation device, a teller is prompted to scan the thermal insulation device in a checkout process. After the code is scanned, the checkout machine modifies the unique identification of the thermal insulation device to be in a sold state, so that the user may continue to use the thermal insulation device when the user goes shopping the next time. If the user does not purchase the thermal insulation device, the unique identification of the thermal insulation device is still in an unsold state. It can be seen that, in the present embodiment, the usage rate of the thermal insulation device may be improved by determining the usage state of the thermal insulation device.

Figure 7:
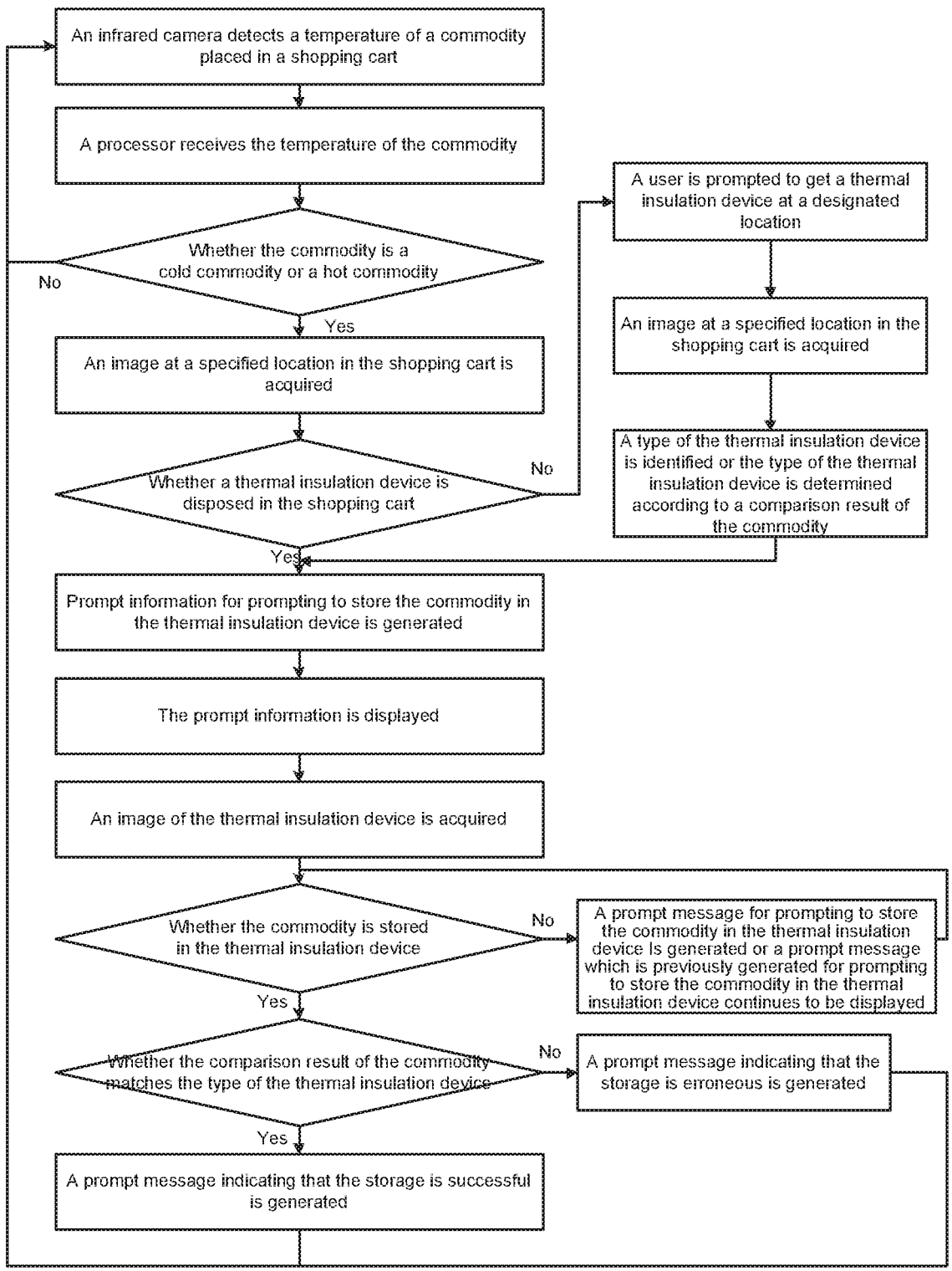
FIG. 7 is a flowchart illustrating still another method for storing a commodity according to an embodiment of the present disclosure.

It can be understood that various features in the method for storing a commodity illustrated in the embodiments shown in FIGS. 1-6 may be combined and adjusted according to a specific scenario, and different solutions may be obtained without a conflict of the features. The above various solutions also fall within the protection scope of the present application. FIG. 7 is a flowchart illustrating still another method for storing a commodity according to an embodiment of the present disclosure. As shown in FIG. 7, an infrared camera detects a temperature of a commodity placed in a shopping cart and transmits the temperature to a processor of the shopping cart. The processor determines whether the commodity is a cold commodity, a hot commodity, or an ordinary commodity according to the temperature of the commodity and temperature thresholds (i.e., a first temperature threshold and a second temperature threshold). When the commodity is an ordinary commodity, the infrared camera continues to be triggered to detect a temperature of a commodity.

When the commodity is a cold commodity or a hot commodity, a color camera acquires an image at a specified location in the shopping cart and transmits the image to the processor. It is analyzed by the processor, according to the image, whether a thermal insulation device is disposed in the shopping cart. When there is no thermal insulation device in the shopping cart, a user may get a thermal insulation device at a designated location in a shopping mall and fix the thermal insulation device at the specified location in the shopping cart. The color camera acquires the image at the specified location in the shopping cart, and acquires an identification code of the thermal insulation device to determine a type of the thermal insulation device, i.e., determining whether the thermal insulation device is a first thermal insulation device for preserving coldness or a second thermal insulation device for preserving heat. Alternatively, the processor determines the type of thermal insulation device according to a first stored commodity in the thermal insulation device.

The processor then generates prompt information for prompting to store the commodity in the thermal insulation device and transmits the prompt information to a display which displays the prompt information.

The color camera collects an image of the thermal insulation device and transmits the image of the thermal insulation device to the processor. The processor acquires the image of the thermal insulation device to determine whether the commodity is stored in the thermal insulation device. If the commodity is not stored in the thermal insulation device, the processor generates a prompt message for prompting to store the commodity in the thermal insulation device, or continues to display a prompt message which is previously generated for prompting to store the commodity in the thermal insulation device until the user detects that the commodity has been stored in the thermal insulation device. If the commodity has been stored in the thermal insulation device, it is determined whether the comparison result corresponding to the commodity matches a type of the thermal insulation device, when the comparison result does not match the type of the thermal insulation device, a prompt message indicating that the storage is erroneous is generated, and when the comparison result matches the type of the thermal insulation device, a prompt message indicating that the storage is successful is generated.

Finally, the processor triggers the infrared camera to detect the temperature of the commodity.

It can be seen that in the present disclosure, a temperature of a commodity which is placed in a shopping cart may be determined by disposing an infrared camera in the shopping cart, and then the commodity is stored in a corresponding thermal insulation device according to whether the type of the commodity is a cold commodity or a hot commodity. Further, it is determined, through a color camera, whether the user stores the commodity in the corresponding thermal insulation device, and a prompt message generated when the storage is successful is different from a prompt message generates when the storage is erroneous, so as to avoid storing hot commodities and cold commodities in the same thermal insulation device in a mixed manner. After the user completes the checkout, the user takes out the commodity from the thermal insulation device to avoid forgetting the commodity; or the user may directly purchase the thermal insulation device and bring the thermal insulation device back together with the commodity to achieve the optimal shopping experience of hot and cold commodities.

Figure 8:
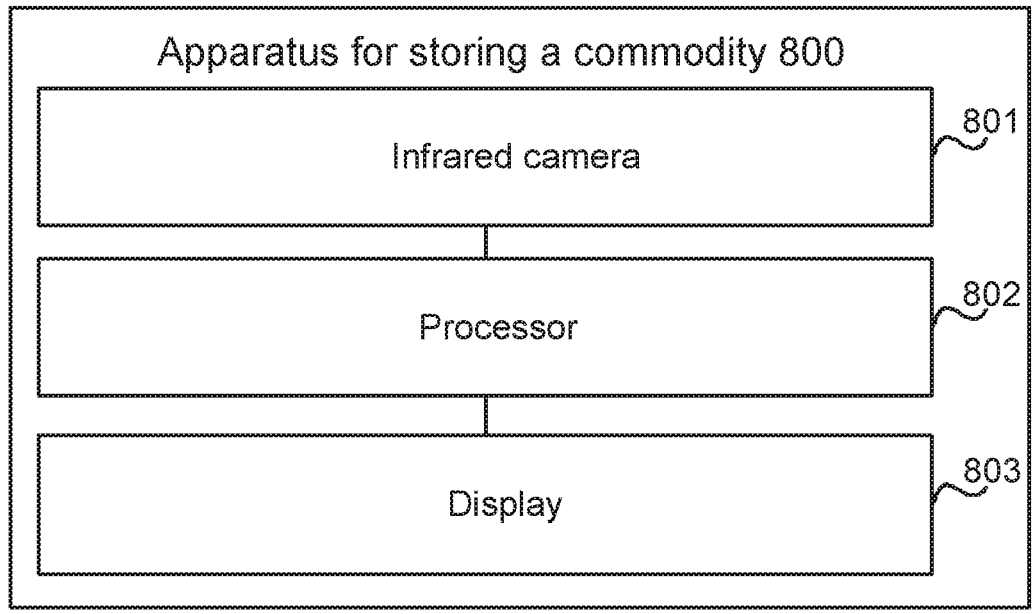
FIG. 8 is a block diagram illustrating an apparatus for storing a commodity according to an embodiment of the present disclosure.

The embodiments of the present disclosure further provide an apparatus for storing a commodity. FIG. 8 is a block diagram illustrating an apparatus for storing a commodity according to an embodiment of the present disclosure. As shown in FIG. 8, the apparatus 800 for storing a commodity comprises an infrared camera 801, a processor 802, and a display 803. Here, the processor 802 is connected to the infrared camera 801 and the display 803, respectively.

The infrared camera 801 is disposed at a specified location (not shown) in a shopping cart, and is configured to collect a temperature of the commodity in the shopping cart and transmit the temperature to the processor 802.

The processor 802 is configured to acquire the temperature of the commodity, compare the temperature with temperature thresholds to obtain a comparison result, and determine, according to the comparison result, whether to generate a prompt message for prompting to store the commodity in a thermal insulation device.

The display 803 is configured to display the prompt message.

Alternatively, the shopping cart further comprises a thermal insulation device. The thermal insulation device is configured to maintain a temperature of a stored commodity.

Alternatively, the thermal insulation device comprises a first thermal insulation device for preserving coldness or a second thermal insulation device for preserving heat. The processor 802 is further configured to:

when the comparison result indicates that the temperature is less than or equal to the first temperature threshold, determine to generate a prompt message for prompting to store the commodity in the first thermal insulation device;

when the comparison result indicates that the temperature is greater than or equal to the second temperature threshold, determine to generate a prompt message for prompting to store the commodity in the second thermal insulation device, wherein the second temperature threshold is greater than the first temperature threshold; and when the comparison result indicates that the temperature is greater than or equal to the first temperature threshold and less than or equal to the second temperature threshold, not generate the prompt message.

Figure 9:
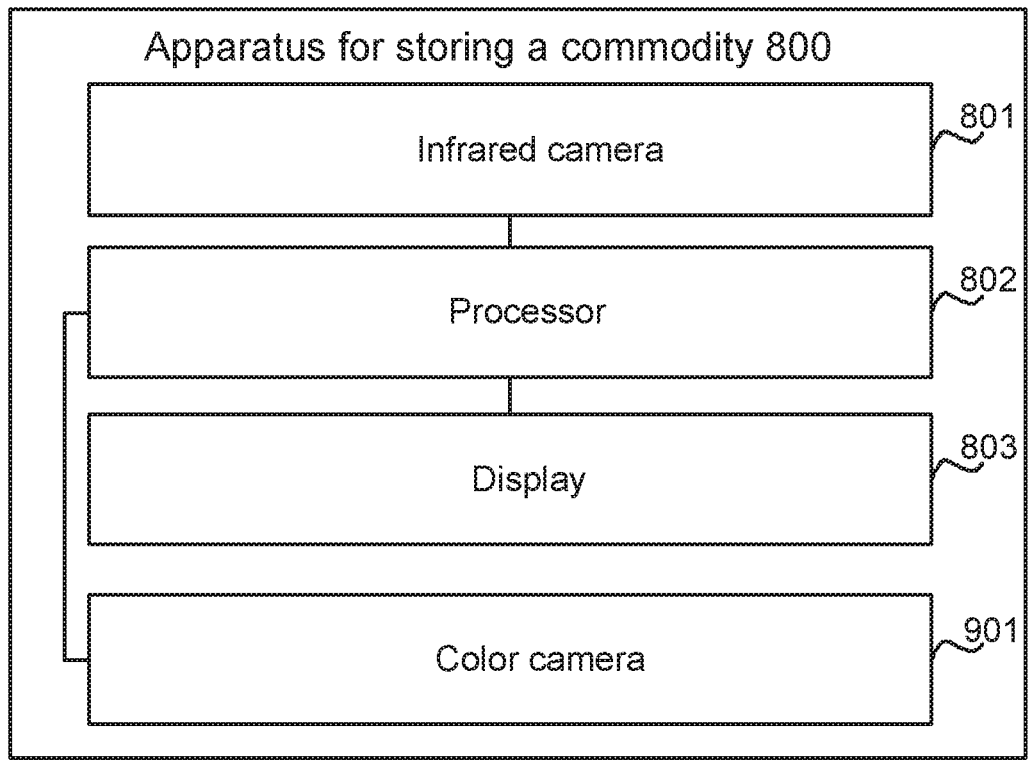
FIG. 9 is a block diagram illustrating another apparatus for storing a commodity according to an embodiment of the present disclosure.

In one embodiment of the present disclosure, there is further provided an apparatus for storing a commodity. FIG. 9 is a block diagram illustrating another apparatus for storing a commodity according to an embodiment of the present disclosure. As shown in FIG. 9, on the basis of the apparatus for storing a commodity shown in FIG. 8, the apparatus 800 for storing a commodity further comprises a color camera 901. The color camera 901 is connected to the processor 802, and is configured to collect an image of the thermal insulation device and transmit the image of the thermal insulation device to the processor 802. The processor 802 is further configured to: acquire an image of the thermal insulation device; and determine, according to an identification code of the thermal insulation device in the image, whether the thermal insulation device is the first thermal insulation device or the second thermal insulation device.

Alternatively, the processor 802 is further configured to: determine whether the commodity is a first stored commodity in the thermal insulation device; and when the commodity is a first stored commodity in the thermal insulation device, determine, according to the comparison result corresponding to the commodity, whether the thermal insulation device is the first thermal insulation device for preserving coldness or the second thermal insulation device for preserving heat.

Alternatively, the color camera 901 is further configured to collect an image at a specified location in the shopping cart; and the processor is further configured to: acquire an image at a specified location in the shopping cart;

analyze, based on the image, whether a thermal insulation device is disposed in the shopping cart; and when a thermal insulation device is disposed in the shopping cart, control the display to display an icon of the thermal insulation device; and when no thermal insulation device is disposed in the shopping cart, generate a prompt message for prompting to get a thermal insulation device at a designated location.

Alternatively, the processor 802 is further configured to: acquire an image of the thermal insulation device; analyze, according to the image, whether the commodity is stored in the thermal insulation device to obtain an analysis result; and generate a prompt message corresponding to the image according to the analysis result.

Alternatively, the processor 802 is further configured to: when the analysis result indicates that the commodity is not stored in the thermal insulation device, generate a prompt message for prompting to store the commodity in the thermal insulation device.

Alternatively, the processor 802 is further configured to: when the analysis result indicates that the commodity has been stored in the thermal insulation device, determine whether the comparison result corresponding to the commodity matches a thermal insulation type of the thermal insulation device, wherein the thermal insulation type comprises a coldness preservation type and a heat preservation type; and when the comparison result corresponding to the commodity matches the thermal insulation type of the thermal insulation device, generate a prompt message indicating that the storage is successful; and when the comparison result corresponding to the commodity does not match the thermal insulation type of the thermal insulation device, generate a prompt message indicating that the storage is erroneous.

Figure 10:
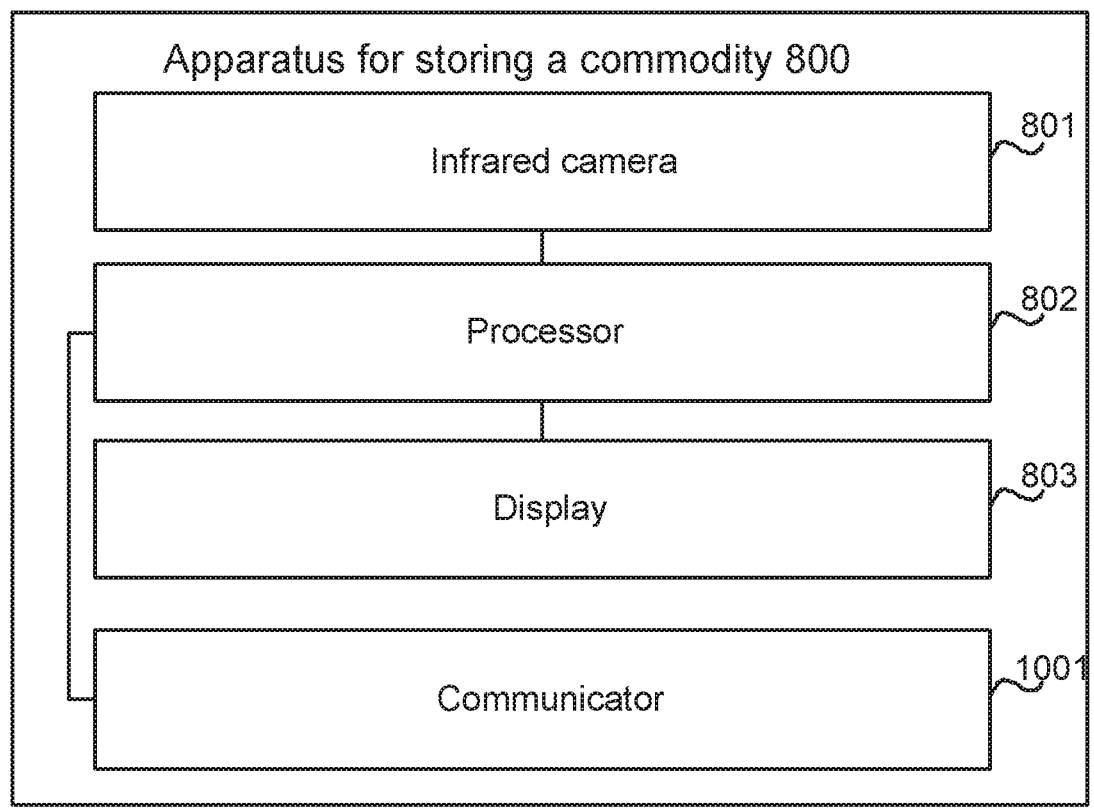
FIG. 10 is a block diagram illustrating still another apparatus for storing a commodity according to an embodiment of the present disclosure.

Alternatively, as shown in FIG. 10, the apparatus 800 for storing a commodity further comprises a communicator 1001. The communicator 1001 is connected to the processor 802 and a checkout machine (not shown) at a counter, respectively, and is configured to receive checkout information transmitted by the checkout machine, and transmit the checkout information to the processor 802. The processor 802 is further configured to: when the checkout information is received, generate a prompt message for prompting to take out the commodity from the thermal insulation device.

According to a third aspect of the embodiments of the present disclosure, there is provided a computer readable storage medium having stored thereon a computer program, which when being executed by a processor, causes the processor to: acquire a temperature of the commodity; compare the temperature with temperature thresholds to obtain a comparison result; and determine, according to the comparison result, whether to generate a prompt message for prompting to store the commodity in a thermal insulation device.

In the present disclosure, the terms "first" and "second" are used for descriptive purposes only and are not to be construed as indicating or implying relative importance. The term "plurality" refers to two or more, unless otherwise specifically defined.

Other solutions of the present disclosure will be readily apparent to those skilled in the art after considering the specification and practicing the present disclosure. The present disclosure is intended to cover any variations, uses, or adaptations of the present disclosure, which are according to general principles of the present disclosure and include common general knowledge or conventional technical means in the art which are not disclosed in the present disclosure. The specification and embodiments are to be considered as illustrative only, and the true scope and spirit of the present disclosure is pointed out by the appended claims.

It is to be understood that the present disclosure is not limited to the precious structure which has been described above and illustrated in the accompanying drawings, and various modifications and changes may be made to the present disclosure without departing from the scope of the present disclosure. The scope of the present disclosure is to be limited only by the appended claims.

We claim:

1. A method for storing a commodity, for a shopping cart in which a thermal insulation device is disposed, the thermal insulation device comprising a first thermal insulation device for preserving coldness or a second thermal insulation device for preserving heat, the method comprises:

acquiring a temperature of the commodity placed in the shopping chart;

comparing the temperature with temperature thresholds to obtain a comparison result; and determining, according to the comparison result, whether to generate a prompt message for prompting to store the commodity in the thermal insulation device,
wherein the determining, according to the comparison result, whether to generate a message for prompting to store the commodity in the thermal insulation device comprises:
if the comparison result indicates that the temperature is less than or equal to a first temperature threshold, determining to generate a prompt message for prompting to store the commodity in the first thermal insulation device;
if the comparison result indicates that the temperature is greater than or equal to a second temperature threshold, determining to generate a prompt message for prompting to store the commodity in the second thermal insulation device, wherein the second temperature threshold is greater than the first temperature threshold; and
if the comparison result indicates that the temperature is greater than or equal to the first temperature threshold and less than or equal to the second temperature threshold, not generating the prompt message, and
the method further comprises:
acquiring an image of the thermal insulation device;
determining, according to an identification code of the thermal insulation device in the image, whether the thermal insulation device is the first thermal insulation device or the second thermal insulation device;
it checkout information is received, generating a prompt message for prompting to take out the commodity from the thermal insulation device;
acquiring the identification code of the thermal insulation device; and
determining, according to the identification code, whether the thermal insulation device is in a sold state or an unsold state.

2. The method according to claim 1, further comprising:
acquiring an image of the thermal insulation device;
determining whether the commodity is a first stored commodity in the thermal insulation device; and
if so, determining, according to the comparison result corresponding to the commodity, whether the thermal insulation device is the first thermal insulation device for preserving coldness or the second thermal insulation device for preserving heat.

3. The method according to claim 1, further comprising:
acquiring an image at a specified location in the shopping cart;
analyzing, based on the image, whether the thermal insulation device is disposed in the shopping cart; and
if so, displaying an icon of the thermal insulation device; and if not, generating a prompt message for prompting to get a thermal insulation device at a designated location.

4. The method according to claim 1, further comprising:
acquiring an image of the thermal insulation device;
analyzing, according to the image, whether the commodity is stored in the thermal insulation device to obtain an analysis result; and
generating a prompt message corresponding to the image according to the analysis result.

5. The method according to claim 4, wherein generating a prompt message corresponding to the image according to the analysis result comprises:
if the analysis result indicates that the commodity is not stored in the thermal insulation device, generating a prompt message for prompting to store the commodity in the thermal insulation device.

6. The method according to claim 4, wherein generating a prompt message corresponding to the image according to the analysis result comprises:
if the analysis result indicates that the commodity has been stored in the thermal insulation device, determining whether the comparison result corresponding to the commodity matches a thermal insulation type of the thermal insulation device, wherein the thermal insulation type comprises a coldness preservation type and a heat preservation type; and
if so, generating a prompt message indicating that the storage is successful; and if not, generating a prompt message indicating that the storage is erroneous.

7. A shopping cart comprising:
an infrared camera configured to collect a temperature of a commodity placed in the shopping cart and transmit the temperature;
a thermal insulation device comprising a first thermal insulation device for preserving coldness or a second thermal insulation device for preserving heat;
a processor connected to the infrared camera, and configured to acquire the temperature of the commodity, compare the temperature with temperature thresholds to obtain a comparison result, and determine, according to the comparison result, whether to generate a prompt message for prompting to store the commodity in the thermal insulation device; and
a display connected to the processor and configured to display the prompt message,
wherein the processor is further configured to:
when the comparison result indicates that the temperature is less than or equal to a first temperature threshold, determine to generate a prompt message for prompting to store the commodity in the first thermal insulation device;
when the comparison result indicates that the temperature is greater than or equal to a second temperature threshold, determine to generate a prompt message for prompting to store the commodity in the second thermal insulation device, wherein the second temperature threshold is greater than the first temperature threshold; and
when the comparison result indicates that the temperature is greater than or equal to the first temperature threshold and less than or equal to the second temperature threshold, not generate the prompt message, and
wherein the shopping cart further comprises:
a color camera connected to the processor, and configured to collect an image of the thermal insulation device, and transmit the image of the thermal insulation device to the processor, wherein the processor is further configured to:
acquire an image of the thermal insulation device; and
determine, according to an identification code of the thermal insulation device in the image, whether the thermal insulation device is the first thermal insulation device or the second thermal insulation device, and
wherein the shopping cart further comprises:
a communicator connected to the processor and a checkout machine at a counter respectively, and configured to receive checkout information transmitted by the checkout machine, and transmit the checkout information to the processor, wherein the processor is further configured to:

when the checkout information is received, generate a prompt message for prompting to take out the commodity from the thermal insulation device;
acquire the identification code of the thermal insulation device; and
determine, according to the identification code, whether the thermal insulation device is in a sold state or an unsold state.

8. The shopping cart according to claim 7, wherein the processor is further configured to:
determine whether the commodity is a first stored commodity in the thermal insulation device; and
when the commodity is a first stored commodity in the thermal insulation device, determine, according to the comparison result corresponding to the commodity, whether the thermal insulation device is the first thermal insulation device for preserving coldness or the second thermal insulation device for preserving heat.

9. The shopping cart according to claim 7, wherein the color camera is further configured to collect an image at a specified location in the shopping cart, and the processor is further configured to:
acquire the image at the specified location in the shopping cart;
analyze, based on the image, whether the thermal insulation device is disposed in the shopping cart; and
when a thermal insulation device is disposed in the shopping cart, control the display to display an icon of the thermal insulation device; and when no thermal insulation device is disposed in the shopping cart, generate a prompt message for prompting to get a thermal insulation device at a designated location.

10. The shopping cart according to claim 7, wherein the processor is further configured to:
acquire an image of the thermal insulation device;
analyze, according to the image, whether the commodity is stored in the thermal insulation device to obtain an analysis result; and
generate a prompt message corresponding to the image according to the analysis result.

11. The shopping cart according to claim 10, wherein the processor is further configured to:
when the analysis result indicates that the commodity is not stored in the thermal insulation device, generate a prompt message for prompting to store the commodity in the thermal insulation device.

12. The shopping cart according to claim 10, wherein the processor is further configured to:
when the analysis result indicates that the commodity has been stored in the thermal insulation device, determine whether the comparison result corresponding to the commodity matches a thermal insulation type of the thermal insulation device, wherein the thermal insulation type comprises a coldness preservation type and a heat preservation type; and
when the comparison result corresponding to the commodity matches the thermal insulation type of the thermal insulation device, generate a prompt message indicating that the storage is successful; and when the comparison result corresponding to the commodity does not match the thermal insulation type of the thermal insulation device, generate a prompt message indicating that the storage is erroneous.

13. A non-transitory computer readable storage medium having stored thereon a computer program, the non-transitory computer readable storage medium being for a shopping cart in which a thermal insulation device is disposed, the thermal insulation device comprising a first thermal insulation device for preserving coldness or a second thermal insulation device for preserving heat, the computer program, when being executed by a processor, causes the processor to:
acquire a temperature of the commodity placed in the shopping cart;
compare the temperature with temperature thresholds to obtain a comparison result; and
determine, according to the comparison result, whether to generate a prompt message for prompting to store the commodity in the thermal insulation device,
wherein the computer program, when being executed by a processor, causes the processor to:
when the comparison result indicates that the temperature is less than or equal to a first temperature threshold, determine to generate a prompt message for prompting to store the commodity in the first thermal insulation device;
when the comparison result indicates that the temperature is greater than or equal to a second temperature threshold, determine to generate a Prompt message for prompting to store the commodity in the second thermal insulation device, wherein the second temperature threshold is greater than the first temperature threshold; and
when the comparison result indicates that the temperature is greater than or equal to the first temperature threshold and less than or equal to the second temperature threshold, not generate the prompt message,
wherein the computer program, when being executed by a processor, further causes the processor to:
acquire an image of the thermal insulation device;
determine, according to an identification code of the thermal insulation device in the image, whether the thermal insulation device is the first thermal insulation device or the second thermal insulation device;
if checkout information is received, generating a prompt message for prompting to take out the commodity from the thermal insulation device;
acquiring the identification code of the thermal insulation device; and determining, according to the identification code, whether the thermal insulation device is in a sold state or an unsold state.

\* \* \* \* \*